US009640965B1

(12) United States Patent
Long et al.

(10) Patent No.: US 9,640,965 B1
(45) Date of Patent: May 2, 2017

(54) CABLE GLAND ASSEMBLY

(71) Applicant: Protonex Technology Corporation, Southborough, MA (US)

(72) Inventors: David N. Long, Northborough, MA (US); Paul W. Kimball, Nashua, NH (US); John R. Plourde, Marlborough, MA (US); Dat Van Nguyen, Worcester, MA (US); Joshua E. Persky, Sutton, MA (US); Nicholas J. Piela, Wilbraham, MA (US)

(73) Assignee: Protonex Technology Corporation, Southborough, MA (US)

( * ) Notice: Subject to any disclaimer, the term of this patent is extended or adjusted under 35 U.S.C. 154(b) by 0 days.

(21) Appl. No.: 15/081,461

(22) Filed: Mar. 25, 2016

(51) Int. Cl.
*H02G 15/06* (2006.01)
*H02G 15/007* (2006.01)
*H02G 15/013* (2006.01)

(52) U.S. Cl.
CPC ........... *H02G 15/06* (2013.01); *H02G 15/007* (2013.01); *H02G 15/013* (2013.01)

(58) Field of Classification Search
CPC .... H02G 15/06; H02G 15/007; H02G 15/013; H02G 3/083; H02G 3/08; H02G 3/22
See application file for complete search history.

(56) References Cited

U.S. PATENT DOCUMENTS

| | | | | |
|---|---|---|---|---|
| 3,280,246 A | * | 10/1966 | Lawson | H01R 9/038 174/78 |
| 3,967,050 A | * | 6/1976 | Makihara | H02G 3/0666 16/2.5 |
| 4,810,832 A | * | 3/1989 | Spinner | H01R 13/5205 174/654 |
| 8,425,240 B2 | * | 4/2013 | Lee | H01R 13/6593 439/607.41 |
| 2011/0154619 A1 | * | 6/2011 | Ward | G02B 6/4471 24/115 R |
| 2014/0209377 A1 | * | 7/2014 | Wang | H02G 15/013 174/658 |
| 2015/0237771 A1 | * | 8/2015 | Natter | H05K 9/0098 174/77 R |

* cited by examiner

*Primary Examiner* — Timothy Thompson
*Assistant Examiner* — Amol Patel
(74) *Attorney, Agent, or Firm* — Adler Pollock & Sheehan P.C.; George N. Chaclas; Daniel J. Holmander (57) ABSTRACT

A cable gland assembly for attaching a shielded cable to an electronic enclosure includes a cable gland housing enclosing and in electrical contact with exposed cable shielding of the shielded cable and providing an electrically conductive pathway between the cable shielding and the electronic enclosure. The cable gland housing further encloses a shield pressure ring disposed to hold the exposed cable shielding in contact with the cable gland housing, a weather gasket, and an exposed portion of a cable strength member. The cable gland assembly includes environmental molding disposed within the cable gland housing to bond to and fix in place the exposed cable shielding, shield pressure ring, weather gasket, and exposed cable strength member. An outer molding is disposed around the cable gland housing.

18 Claims, 4 Drawing Sheets

CABLE GLAND ASSEMBLY

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© Protonex Technology 2016.

2 BACKGROUND OF THE INVENTION

2.1 Field of the Invention

The exemplary, illustrative technology herein relates to cable gland assemblies, methods of use, and methods of manufacturing cable gland assemblies. In particular, the exemplary, illustrative technology relates to improved cable gland assemblies and methods of manufacturing of cable gland assemblies for attaching shielded cables to device enclosures, bulkheads, panels, and the like.

2.2 The Related Art

Entering an electronic device enclosure with a cable conventionally includes terminating the cable with a connector and mounting a mating connector on the device enclosure wall. The cable connector includes either pins or sockets, which terminate the conductors of the cable and interface with mating pins or sockets of the enclosure connector. The interfaced cable and enclosure connectors create a bulky, stiff structure at the enclosure wall whereas it is often desirable to have a low profile, flexible connection. Connectors are thus often required to be as small as possible which makes it difficult for assemblers to physically connect the cable wires to the connector pins or sockets. Furthermore, connectors or cable glands on device enclosures, panels, bulkheads, or the like are typically permanently attached, making it difficult to exchange one connector for another as may be required if, for example, an existing connector is damaged or if there is otherwise a need to install a different connector.

Shielded cables are typically terminated by connectors that include electrically conductive elements, such as a metal screen or metal housing. An electrically conductive cable shielding layer of the cable is stretched over the electrically conductive element and clamped or crimped in place such that cable shielding and housing together provide EMI shielding or a Faraday shield for conductors or wires of the cable. For example, U.S. Pat. No. 7,976,341 entitled SHIELDED CONNECTOR AND METHOD OF PRODUCING THE SAME issued to Osenberg on Jul. 12, 2011 includes cable shielding of a cable stretched over metallic screening which is arranged over a metallic connector housing. The cable shielding is held in place by a crimp sleeve. The cable includes conductors which are secured to male pins of the connector. U.S. Pat. No. 4,433,206 entitled EMI SHIELDED CONNECTOR ASSEMBLY, issued to Lewis on Feb. 21, 1984 includes cable shielding stretched over a ferrule and secured with an overlying ferrule clamp. A braided covering of the cable conductors is formed into a pig tail and held in place in the interior of the connector housing with potting material.

However one problem with both of these conventional connectors is a lack of appropriate weather-tight sealing elements to moisture seal the cable gland and the enclosure housing that the cable gland interfaces with in a manner that improves performance in harsh environmental conditions or provides protection against damage even for submersion in liquids.

Additionally, neither reference discloses securing cable strength members in a potting material to improve the cable pull-out or tensile strength.

Definitions

The following definitions are used throughout, unless specifically indicated otherwise:

| TERM | DEFINITION |
| --- | --- |
| Cable gland | A device for passing a cable or tube into an enclosure while providing strain relief and sealing out liquid and dry contaminates. |
| EMI | Electromagnetic Interference |

3 SUMMARY OF THE INVENTION

These and other aspects and advantages will become apparent when the description below and read in conjunction with the accompanying drawings. In particular an improved cable gland assembly is disclosed below. The cable gland assembly is provided to attach a shielded cable to an enclosure housing. A first end of the shielded cable passes through the cable gland into the enclosure housing. The enclosure housing encloses an electrical system or electrical elements and the first end of the shielded cable is terminated at termination points of the electrical system, inside the enclosure housing.

The shielded cable includes a plurality of conductive strands each surrounded by an electrically insulating layer. An inner strength member comprising bundled fibers is disposed parallel to the plurality of conductive stands. The plurality of conductive strands and the inner strength member are surrounded by an outer strength member comprising bundled fibers. The strength members increase the tensile or pull strength of the shielded cable. The plurality of conductive strands, the inner strength member and the outer strength member are surrounded by a cable shielding layer. The cable shielding layer is a cylindrical tube formed of braided metal material that tends to prevent EMI from being transmitted through the cable shielding layer. The cable shielding layer is surrounded by an electrically insulating cable sheath.

A cable gland housing is formed by an annular wall surrounding a hollow cavity. The annular wall includes an inside surface facing the hollow cavity and an outside surface radially opposed to the inside surface. A first end of the annular wall is configured to mechanically interface with the enclosure housing through a housing aperture. A second end of the annular wall is configured to mechanically interface with the shielded cable at a first terminal end of the shielded cable. A first aperture defined by the inside surface at a first end of the annular wall provides access from the hollow cavity into the enclosure housing through the housing aperture. A second aperture defined by the inside surface at a second end of the annular wall provides access for receiving a first terminal end of the shielded cable into the hollow cavity through the hollow cavity.

A portion of the cable sheath is stripped from the first terminal end of the shielded cable to expose the cable shielding layer inside the hollow cavity. A portion of the cable shielding layer is stripped from the first terminal end of the shielded cable to leave a length of the cable shielding layer exposed and flayed radially outward inside the hollow cavity and to leave a length of the outer strength member and a length of the inner strength member flayed radially outward inside the hollow cavity.

A weather gasket comprising an annular ring is disposed inside the hollow cavity between the cable sheath and the inside surface of the annular wall proximate to the second aperture. The weather gasket is configured to apply a radially inwardly directed compression force against the cable sheath when the weather gasket is compressed between the inside surface and the cable sheath.

A cable shield pressure ring comprising an annular ring is installed inside the hollow cavity between the conductive strands and the flayed out cable shielding layer. The cable shield pressure ring is configured to apply an expansion force directed radially outward from a central axis of the annular ring to act on the flayed out cable shielding layer such that the flayed out cable shielding layer is forced into mating contact with the inside surface.

A first environmental molding material is disposed inside the hollow cavity to substantially fill annular space surrounding the cable sheath between the weather gasket and a trim line of the cable sheath. The first environmental molding material comprises a material that bonds to the cable sheath and bonds to the inside surface of the annular wall. A second environmental molding material is disposed inside the hollow cavity to substantially fill annular space that extends from the trim line to the first aperture. The second environmental molding material comprises a material that bonds to the surfaces of the cable shield pressure ring, bonds to the cable shielding layer, bonds to fibers of the inner strength member and to the fibers of the outer strength member and bonds to the inside surface of the annular wall.

An outer molding is formed to fit over the outside surface of the annular wall between the housing aperture and the second end of the annular wall. The outer molding is formed from a thermoplastic material of a thermoset material. The first end of the annular wall is configured to mechanically interface with the housing aperture by threaded engagement and the annular wall comprises aluminum.

4 BRIEF DESCRIPTION OF THE DRAWINGS

The features of the present invention will best be understood from a detailed description of the invention and example embodiments thereof selected for the purposes of illustration and shown in the accompanying drawings in which.

4.1 Item Number List

The following item numbers are used throughout, unless specifically indicated otherwise.

| # | DESCRIPTION |
|---|---|
| 100 | Cable assembly |
| 105 | Shielded cable |
| 110 | Enclosure housing |
| 115 | Cable gland assembly |
| 120 | External electrical connector |
| 125 | Moisture sealing end cap |
| 130 | Insulating conductive stands |
| 200 | Cable gland housing |
| 205 | Annular wall |
| 210 | Hollow cavity |
| 215 | Longitudinal axis |
| 220 | Housing interface end |
| 225 | Cable interface end |
| 230 | First circular aperture |
| 235 | Second circular aperture |
| 240 | External threads |
| 245 | Shoulder |
| 300 | Multi-strand cable |
| 305 | Conductive strand |
| 310 | Outer strength member |
| 315 | Cable shielding layer |
| 320 | Cable sheath |
| 325 | Inner strength member |
| 400 | Exploded cable gland assembly view |
| 405 | Cable gland assembly |
| 410 | Cable shielding layer |
| 415 | Outer strength member |
| 418 | Terminated conductive strands |
| 420 | Conductive strands |
| 430 | Outer molding |
| 435 | Weather gasket |
| 440 | Cable shield pressure ring |
| 500 | Final cable gland assembly |
| 505 | Annular weather gasket groove |
| 510 | Cable sheath trim line |
| 515 | First environmental molding material |
| 520 | Annular pressure ring groove |
| 525 | Second environmental molding |
| 530 | Annular grooves |
| 535 | Outer molding interface |
| 540 | Outer molding interface |

5 DESCRIPTION OF SOME EMBODIMENTS OF THE INVENTION

Figure 1:
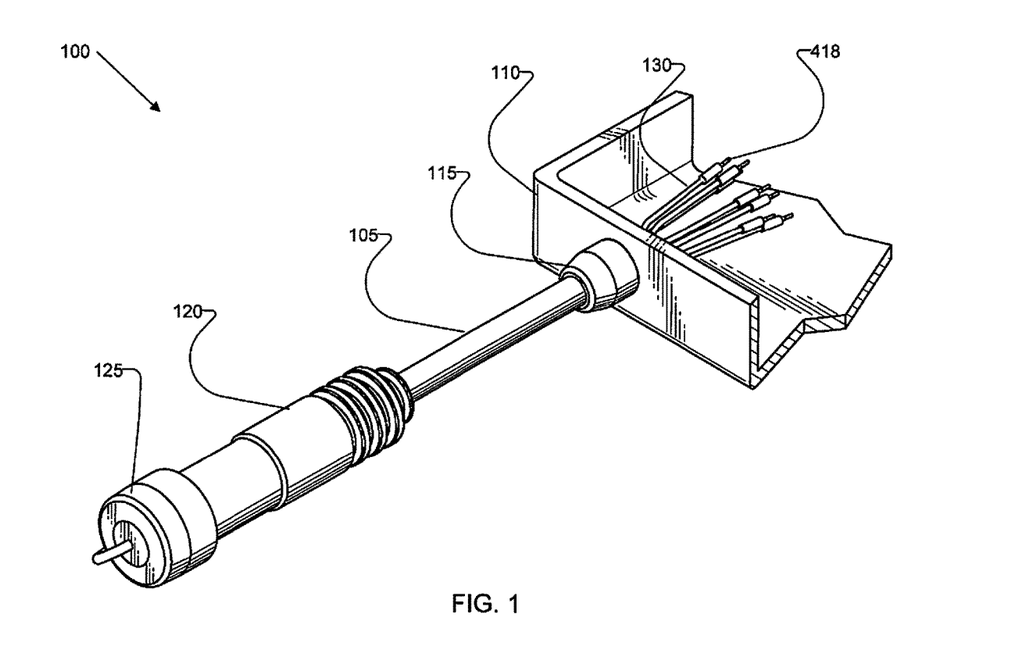
FIG. 1 depicts a perspective view of a non-limiting exemplary cable assembly according to one aspect of the present invention.

Referring to FIG. 1, a cable assembly (100) for attaching a shielded cable (105) to a device enclosure (110) through a cable gland assembly (115) is depicted in isometric and cutaway views. The shielded cable assembly includes the shielded cable (105) terminated at an external end thereof by an external electrical connector (120). In one non-limiting exemplary embodiment, the external electrical connector (120) is a multi-pin connector usable to provide an electrical interface between an electrical device, such as a rechargeable DC battery or a battery operated power device, not shown.

The external electrical connector (120) is preferably configured for use in harsh outdoor environments and optionally includes a moisture sealing end cap (125) usable to prevent cable pins and or sockets of the external electrical connector (120) from exposure to moisture and other environmental contaminants as well as preventing an electrical shock hazard. In particular the external electrical connector (120) of the present invention is configured to connect with various rechargeable DC batteries and or DC battery powered devices; however other connector types are usable including a Universal Serial Device (USB) connector, without deviating from the present invention.

The cable gland assembly (115) passes partially through the device enclosure (110) and is attached to the device enclosure (110) by threaded engagement, or other engagement techniques including by spring force, by interference fit by a latching mechanism, by threaded fasteners, by adhesive bonding, or the like. In one non-limiting example embodiment walls of the enclosure housing (110) comprise an electrically conductive metal material such as aluminum, which has a resistivity of about $2.7 \times 10^{-8}$ to $6.4 \times 10^{-8}$ Ohm-m depending on the aluminum alloy. Alternately the device enclosure (110) can be formed from any suitable electrically conducting material such as other metals or a conductive polymer having a resistivity of less than about 0.1 Ohm-m. In the present non-limiting exemplary embodiment, the device enclosure (110) encloses electrical components of an electronic device such as a power distribution manager.

The shielded cable (105) includes a plurality of insulated conductive strands (130) or conductive channels enclosed by an electrically conductive cable shield or shielding layer, described below. Each conductive strand (130) is terminated at the external electrical connector (125). Preferably the plurality of conductive strands (130) is suitable to provide at least one power channel and at least one communication channel. The shielding layer tends to prevent electromagnetic interference (EMI) from being emitted through the shielding layer in either direction to thereby reduce EMI levels that can escape from inside the shielded layer to interfere with external devices or that can pass through the shielding layer from external devices to the plurality of conductive strands (130). More generally, the conductive shielding layer reduces the coupling of radio waves and or electrostatic fields across the shielding layer which is also known, as with a Faraday Cage. In the present non-limiting example embodiment, the shielded cable (105) is configured to transmit both a DC power signal and a communication signal over the plurality of insulated conductive strands (130).

Figure 2:
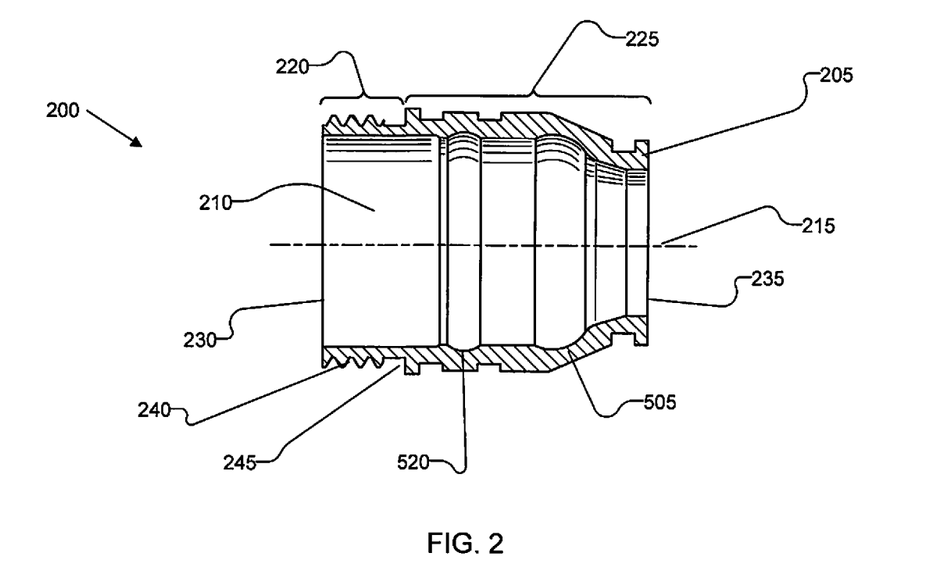
FIG. 2 depicts a side sectional view taken through a non-limiting exemplary connector housing according to one aspect of the present invention.

Referring to FIG. 2 a cable gland housing (200) is formed by an annular wall (205) that surrounds a hollow cavity (210) which is centered by a longitudinal axis (215). An outside circumference of the annular wall (205) forms an externally threaded housing interface end (220) and a cable-interface end (225). The annular wall (205) forms a first substantially circular aperture (230) at the housing interface end (220) and a second substantially circular aperture (235) opposing the first circular aperture (230) with both circular apertures centered by the longitudinal axis (215). Both internal and external circumferential surfaces of the annular wall (205) are formed to include a plurality of annular protrusions, annular depressions and other shape variations usable to interface with a cable passing through the hollow cavity (210), to interface with the enclosure housing (110) at the housing interface end (225) and with various gaskets and weather proofing elements, as will be further described below.

The cable gland housing (200) comprises an electrically conductive metal material such as aluminum, which has a resistivity of about $2.7 \times 10^{-8}$ to $6.4 \times 10^{-8}$ Ohm-m depending on the aluminum alloy. Alternately the cable gland housing (200) can be formed from any suitable electrically conductive material having a resistivity of less than about 0.1 Ohm-m which includes some polymer materials such as polystyrene sulfonate. The cable gland housing (200) is formed from by machining, casting, molding, or the like and either as a single element or as a plurality of elements joined together. The cable gland housing (200) is optionally treated for corrosion resistance, e.g. by a passivation layer which shields surfaces thereof from environmental exposure, e.g. to oxygen. In a further non-limiting example embodiment, the cable gland housing (200) comprises non-conductive portions and conductive portions wherein the conductive portion at least provides an electrically conductive pathway suitable for grounding the cable shielding surrounding the conductive strands (130) to the enclosure housing (110).

Figure 3:
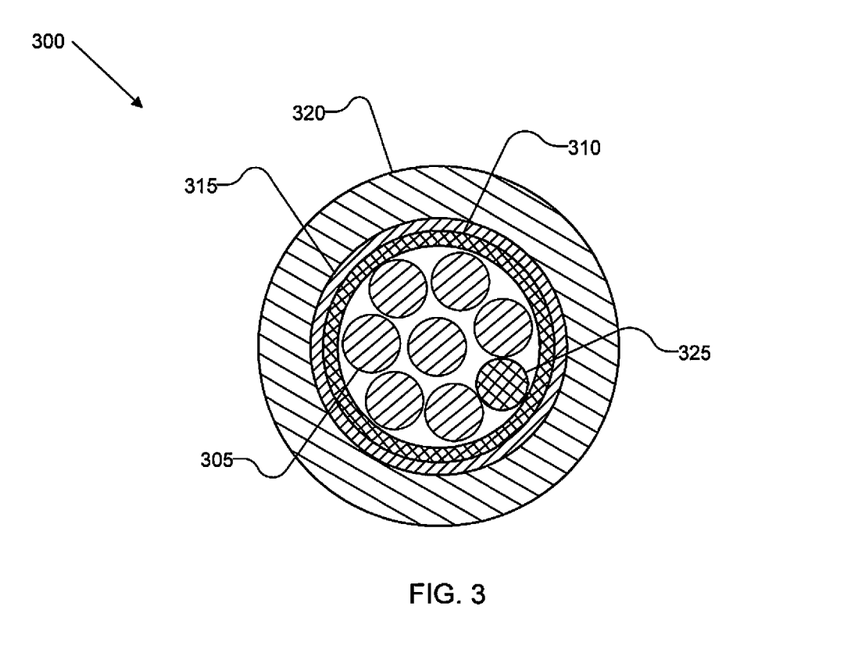
FIG. 3 depicts a sectional view of a non-limiting exemplary conventional multi-strand electrical power cable a according to one aspect of the present invention.

Referring now to FIG. 3 a sectional view of a conventional multi-strand electrical power cable (300) taken through a transverse axis perpendicular to a longitudinal axis of the power cable is shown. In the present non-limiting example embodiment the multi-strand cable (300) includes a plurality of conductive stands (305) surrounded by an outer strength member (310) which is further surrounded by an electrically conductive cable shield or cable shielding layer (315) which is further surrounded by an electrically insulating cable sheath (320). An optional inner strength member (325) is shown running parallel to the conductive strands. Each of the inner strength member (325) and the outer strength layer (310) comprises bundled fibers or yarn, for example Aramid yarn or fibers. The fibrous strength members each extend longitudinally along the full longitudinal length of the cable providing flexible reinforcement that increases the cable pull or tensile strength and the cable crush or compression strength. In a preferred embodiment the multi-strand cable (300) includes at least two and preferably three or more conductive strands (305) for connecting to power and ground terminals as well as one or more additional conductive strands for use as communication channels, sensor signal channels, or the like.

Figure 4:
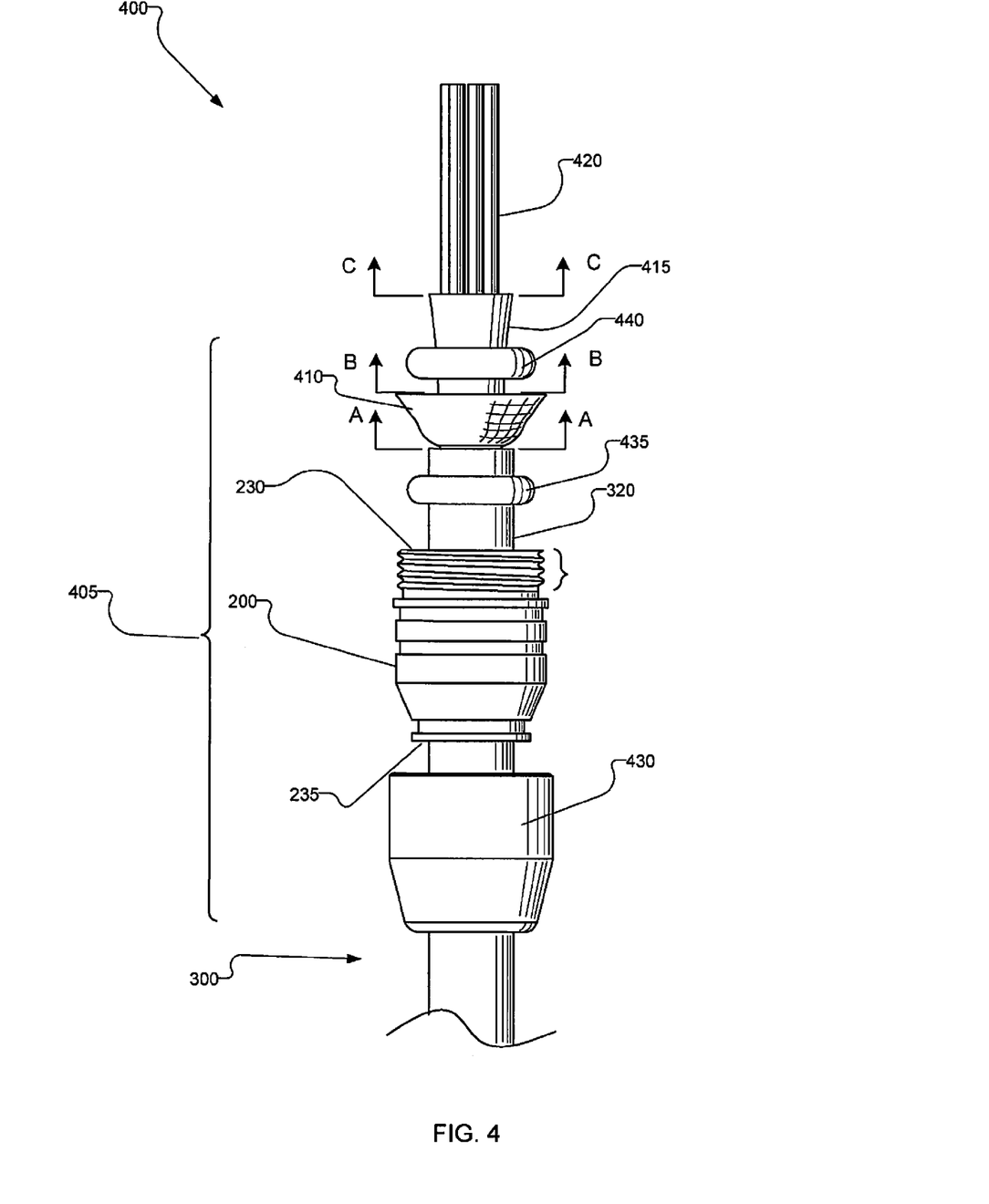
FIG. 4 depicts an exploded view of a non-limiting exemplary cable connector according to one aspect of the present invention.

Referring now to FIGS. 2-5, an exploded cable gland assembly view (400) of a conventional multi-strand electrical power cable (300) being assembled with a cable gland assembly (405) of the present invention is shown in FIG. 4. In a first assembly step the cable gland housing (200) is installed over a terminal end of the multi-strand cable (300). The cable terminal end is inserted into the second circular aperture (235) of the cable gland housing (200) and extends through the first circular aperture (230). An outer molding (430), described below, may be installed over the cable terminal end prior to installing the cable gland housing (200) over the cable terminal end. However, the outer molding (430) is only shown separately in FIG. 4 for clarity since the outer molding (430) is preferably molded onto the cable gland housing (200) either prior to assembling the cable gland housing (200) onto the multi-strand cable (300) or after assembling the cable gland housing (200) onto the cable.

In a second assembly step, the multi-strand cable (300) is prepared by stripping only the insulating cable sheath (320) from a terminal end thereof to expose the underlying cable shielding layer (410). In a non-limiting example embodiment, a 2-5 inch length of only the cable sheath (320) is trimmed from the cable. The arrows (A-A) depict the location where the cable sheath (320) is removed to. In a second step, a portion of only the exposed cable shielding layer (410) is trimmed from the multi-strand cable (300) to expose the underlying outer strength member (415).

In various embodiments, the cable shielding layer (410) is formed by a cylindrical tube of braided metal such as braided copper, aluminum, tin, steel, brass, bronze, silver, or the like. The braided metals can be a composite metal structure such as tin plated or copper covered steel, copper plated with tin, or the like. The cable shielding layer (410) can also include composite shielding layers that combine non-conductive mono-filaments, or the like, interwoven with conductive metal strands. In further embodiments the cable shielding layer (410) may include two layers, such as an inner aluminum foil layer, not shown, surrounded by an outer braided metal layer such as braided tin plated copper, or the like. In any case the cable shielding layer (410) described herein collectivity describes single and double layer shielding layers, metal braided shielding, non-braided metal foil shielding, and composite shielding layers that include a combination of highly conductive, less conductive, and substantially non-conductive materials in combination.

In a third step, the exposed cable shielding layer (410) is trimmed to leave a length of about 0.5-1.5 inch of the exposed cable shielding layer (410) extending from the cable sheath (320) as shown by arrows (B-B). In a fourth step, a portion of only the exposed outer strength member (415) is trimmed from the cable to expose the underlying conductive strands (420) and any inner strength members (325) that may be included. In a non-limiting example embodiment, the exposed outer strength member (415) is trimmed to leave about 0.5-1.5 inch of the exposed outer strength member (415) extending from the cable shielding layer (410) as shown by arrows (C-C). As will be recognized by those skilled in the art, the cable trimming steps two through four can be completed before installing the cable gland housing (200) and the outer molding (430) onto the multi-strand cable (300). In any event if the cable gland housing (200) and the outer molding (430) are not installed onto the multi-strand cable (300) terminal end they should be installed before the next step.

In a fifth step a weather gasket (435), such as an O-ring, is assembled onto the multi-strand cable (300) over the cable sheath (320) between the end of the cable sheath (320) and the cable gland housing (200). In a sixth step, the exposed cable shielding layer (410) is flayed radially outward away from the outer strength member (415). In a seventh step, a cable shield pressure ring (440), such as an O-ring, is installed onto the terminal end of the multi-strand cable (300) over the exposed outer strength member (310).

Figure 5:
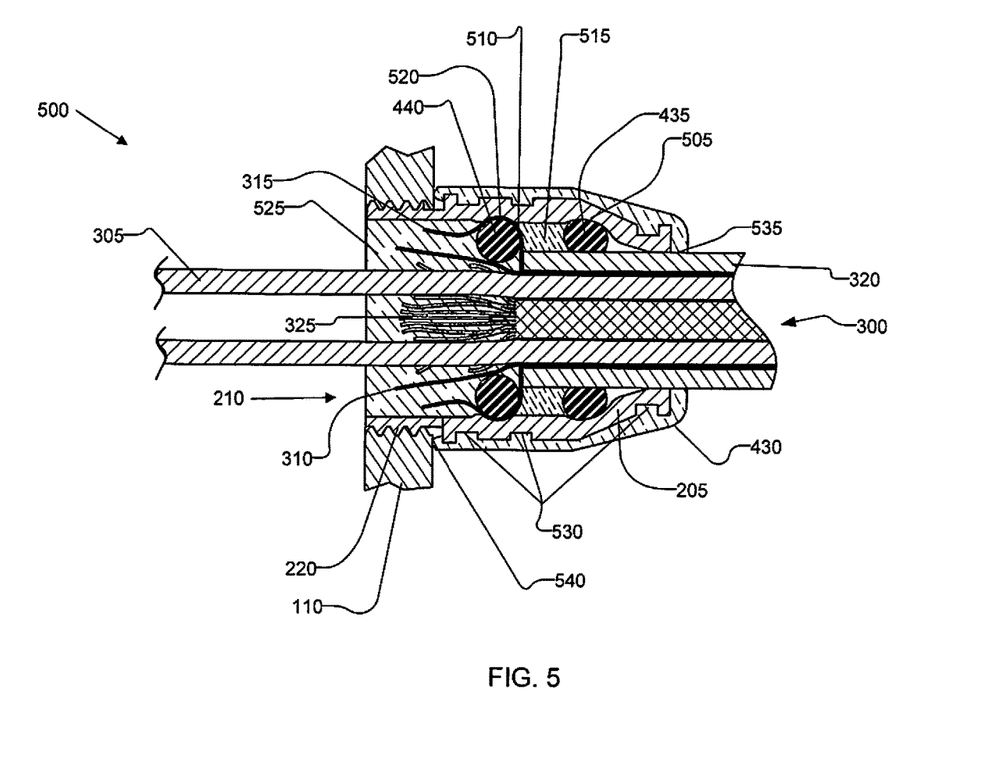
FIG. 5 depicts a side sectional view taken through a non-limiting exemplary cable connector according to one aspect of the present invention.

Turning now to FIG. 5, a final cable gland assembly (500) is shown fully assembled and mounted to a wall of the enclosure housing (110) according to the present invention. The final cable gland assembly (500) shows the cable gland housing (200) attached to the enclosure housing (110) by threaded engagement between the external threads (240) formed on the housing interface end (220) of the cable gland housing (200) and a threaded housing aperture that passes through a sidewall of the enclosure housing (110). The final cable gland assembly (500) shows the outer molding (430) installed over the outside surface of the cable gland housing (200) covering the cable interface end (225). The final cable gland assembly (500) shows the terminal end of the multi-strand cable (300), i.e. the conductive strands (305) extending into the enclosure housing with the cable sheath (320) extending into the hollow cavity (210) formed by the annular wall (205) through the second aperture (235) and positioned with the cable sheath trim line (510) positioned about half way between the first circular aperture (230) and the second circular aperture (235). The final cable gland assembly (500) shows the weather gasket (435) engaged with an annular weather gasket groove (505) formed on an inside surface of the annular wall (205).

In a seventh assembly step the weather gasket (435) and multi-strand cable (300) are manipulated to engage the weather gasket (435) to seat with the annular weather gasket groove (505) while the weather gasket is surrounding the cable sheath (320). In the seated position, the weather gasket (435) is compressed against the cable sheath (320). More specifically an inside diameter of the weather gasket (435) is sized to substantially match or to be formed slightly smaller than an outside diameter of the cable sheath (320). Additionally an outside diameter of the annular weather gasket groove (505) is formed slightly smaller than an outside diameter of the weather gasket (435) such that when the weather gasket is engaged with the annular weather gasket groove (505) while the weather gasket is surrounding the cable sheath (320) the weather gasket is in compression and applies a radially inwardly directed compression force against the cable sheath. Additionally a longitudinal position of the multi-strand cable (300) is adjusted to position the cable sheath trim line (510) about half way between the first circular aperture (230) and the second circular aperture (235).

In an eighth assembly step a first environmental molding material (515) is injected into the hollow cavity of (200) to substantially fill an annular space surrounding the cable sheath (320) wherein the annular space extends longitudinally between the weather gasket (435) and the cable sheath trim line (510). The first environmental molding material (515) is poured as a liquid and then hardens or cures in place. The first environmental molding material (515) preferably bonds to the cable sheath (320) and inside surfaces of the annular wall (205) and to the weather gasket (435) to hold the weather gasket and multi-strand cable (300) is place and to provide a substantially gas and liquid tight barrier between the second aperture (235) and the surrounding ambient environment.

In a non-limiting embodiment, the weather gasket (420) is formed from a compressible polymer material such as an ethylene propylene diene monomer (EDPM) rubber, which can have a modulus of elasticity of about 0.75 to 1.25 MPa depending on formulation. The first environmental molding material (515) comprises a liquid sealant in an uncured state that is flowable into the sealing volume described above. Suitable liquid sealants include a low viscosity curable epoxy such as such as Resinlab EP 1282, which is a two-part encapsulant epoxy with a mixed viscosity of 3000 cps.

In an eighth assembly step, the exposed portion of cable shielding layer (315) is flayed radially outward and the cable shield pressure ring (440) is installed over the outer strength member and under the flayed out cable shielding layer (315) in a manner that causes the cable shielding layer (315) to become forced into mating contact with an inside surface of the annular wall (205) substantially around the entire circumference thereof. In particular the cable shield pressure ring (440) is longitudinally positioned to engage with an annular pressure ring groove (520) sized and properly shaped to engage with the cable shield pressure ring (440).

Prior to final assembly, the annular pressure ring groove (520) is optionally coated with an electrically conductive paste such as a conductive silver paste, which has a resistivity of about $1.0 \times 10^{-8}$ to $3.0 \times 10^{-8}$ Ohm-m. In the present, non-limiting embodiment, the cable shield pressure ring (440) comprises a non-electrically conductive O-ring that is formed from a compressible polymer material such as an ethylene propylene diene monomer (EDPM) rubber, with modulus of elasticity of about 0.75 to 1.25 MPa. The cable shield pressure ring (440) is selected with an outer diameter over-sized relative to the largest outside diameter of the annular pressure ring groove (520). Accordingly, when the cable shield pressure ring (440) is engaged with the annular pressure ring groove (520), an expansion force directed substantially radially out from a center axis of the cable shield pressure ring (440) is generated by compressing the cable shield pressure ring (440) which tends to force the cable shielding layer (410) into mating contact with the inside surface of the annular wall (205) and provides an electrically conductive path that extends from the cable shielding layer (315) to the annular wall (205) and then to the enclosure housing (110) through the threaded engagement (240) at the housing interface end (220) with a threaded aperture that passes through the enclosure wall (110). In the present, non-limiting embodiment, cable shield pressure ring (440) comprises an O-ring having a circular cross sectional shape; however, other mechanical elements such as a metal spring, or the like, may be used to apply the desired outward radial expansion force to hold the cable shielding layer (315) in electrical contact with the annular wall (205) without deviating from the present invention. It is further noted that the above described assembly technique and elements substantially enclose the conductive strands (305) within a Faraday Cage comprising the cable shielding layer (315), the cable gland housing (200) and the external connector (120).

In a ninth assembly step, the outer strength member (310) is flayed out or unwoven to expose individual threads or fibers surrounding the conductive stands (305). Additionally, if an inner strength member (325) is present, the inner strength member (325) is flayed out or unwoven to expose individual threads or fibers thereof. Both of the strength members may extend through the first circular aperture (230) during initial assembly and held in place for the next step.

In a tenth step, a liquid sealant such as a low viscosity curable epoxy is injected into the hollow cavity (210) and is cured to form a second environmental molding (525). The liquid sealant can comprise any suitable bonding or potting material that is flowable in an uncured state, e.g., with a viscosity of 3000 cps or less, to fill void spaces within hollow cavity (210) to at least partially surround the flayed out cable shielding layer (315), the cable shield pressure ring (440), the inner strength member (325) and outer strength member (310). The cured sealant fixes in place and preferably bonds to threads or fibers of the inner strength member (325), threads and fibers of the outer strength member (310) and to surfaces of the cable shield pressure ring (440), the cable shielding layer (315), and the inside surface of the annular wall (205). In a non-limiting embodiment, the cured sealant is a two part encapsulant epoxy such as Resinlabs EP1282 that has tensile yield strength of at least 800 PSI when cured. In a non-limiting embodiment, fibers comprising inner and outer strength members (325) and (310) are separated from each other and soaked with the curable liquid sealant prior to injecting the sealant into inner cavity (210).

The outer molding (430) is formed to fit over a contour of the cable interface end (225) of the cable gland housing (200). The outer molding (430) comprises a material suitable for low pressure molding, which is tough when cured and has a fast cure time such as a polyurethane or a thermoplastic polyamid. The outer molding (430) can be formed with polyurethane, thermoplastic polyamides including Macromelt 6208 (manufactured by Henkel AG & Company), and other suitable polyvinyl chlorides, nylons or other thermoplastic or thermoset materials. In the present, non-limiting, embodiment outer molding (460) is formed by an insert molding or over molding process wherein uncured material comprising outer molding (460) flows into and fills annular grooves or channels (530) formed on the outer circumferential surface of the on annular wall (205). Preferably, each annular groove (530) extends completely around the outer circumferential surface of the annular wall (205). When cured, the interface of outer molding (430) with the annular grooves (530) increases grip and retention strength of outer molding (430) on the cable gland housing (200) to thereby increase a pull out strength of the multi-strand cable (300) with respect to the cable gland housing (200). In an alternate embodiment, outer molding (430) can be formed in a separate manufacturing step and assembled onto the cable gland housing (200). As is further shown in FIG. 5, the outer modeling (430) preferably fits tightly to the cable sheath (320) around its entire circumference at the cable to outer molding interface (535). Additionally, the outer molding (430) preferably fits tightly against the enclosure wall (110) at the enclosure wall to outer molding interface (540). Additionally a bead of weather sealant e.g. silicon caulking or the like, can be applied at the outer molding interface (540) to further weather seal the interface.

Bonding between the second environmental molding (525) and one or more of inner strength member (325) and outer strength member (310) increases the amount of force required to dislodge the multi-strand cable (300) from the cable gland housing (200).

After completion of the cable gland assembly (405), the cable gland assembly is installed onto the enclosure housing (110) e.g. after the bead of weather sealant is applied at the outer molding interface (540). Thereafter the conductive strands (305) may be terminated as needed inside the enclosure before closing the enclosure. In use the external electrical connector (120) is connected to an external device, not shown, to exchange power and communication signals between the connected external device and whatever electrical device is operating inside the enclosure housing (110).

Referring now to FIGS. 2 and 5 the housing interface end (220) of the cable gland housing (200) includes external threads (240) and a shoulder (245) provided to interface with mating internal threads of an aperture passing through a wall of the device enclosure (110). In this embodiment, it is possible to remove the cable gland assembly from the enclosure by disengaging the threaded cable gland housing (200) from the enclosure wall (110) even if the threads have been sealed by a weather sealant or secured by a breakable adhesive bond. However other more permanent attaching methods may be preferable in some applications that do not include threaded engagement but instead may rely on a more permanent attachment such as using a pressure or interference fit, brazing or soldering, or more resilient adhesive bond. Additionally the conducting strands (305) may include a plurality of individually insulated electrically conductive wires, one or more twisted wire pairs, or the like.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. for DC power systems), those skilled in the art will recognize that its usefulness is not limited thereto and that the present invention can be beneficially utilized in any number of environments and implementations where it is desirable to provide a weather proof cable interface with an enclosure wall that includes forcing a cable shielding layer into mating contact with a connector housing. Accordingly, the claims set forth below should be construed in view of the full breadth and spirit of the invention as disclosed herein.

The invention claimed is:

1. A cable gland assembly for attaching a shielded cable to an enclosure housing wherein the shielded cable comprises at least one conductive strand surrounded by a cable shielding layer wherein the cable shielding layer is surrounded by a cable sheath comprising:

a cable gland housing formed by an annular wall surrounding a hollow cavity wherein the annular wall includes an inside surface facing the hollow cavity and an outside surface radially opposed to the inside surface, wherein a first end of the annular wall is configured to mechanically interface with the enclosure housing through a housing aperture and wherein a second end of the annular wall is configured to mechanically interface with a first terminal end of the shielded cable, wherein a first aperture defined by the inside surface at the first end provides access from the hollow cavity into the enclosure housing through the housing aperture and a second aperture defined by the inside surface at the second end provides access for receiving a first terminal end of the shielded cable into the hollow cavity;

wherein a portion of the cable sheath is stripped from the first terminal to expose the cable shielding layer inside the hollow cavity and wherein a portion of the cable shielding layer is stripped from the first terminal end to leave a length of the cable shielding layer exposed and flayed radially outward inside the hollow cavity;

a weather gasket comprising an annular ring disposed inside the hollow cavity between the cable sheath and the inside surface proximate to the second aperture, wherein the weather gasket is configured to apply a radially inwardly directed compression force against the cable sheath when the weather gasket is compressed between the inside surface and the cable sheath;

a cable shield pressure ring comprising an annular ring installed inside the hollow cavity between the at least one conductive strand and the flayed out cable shielding layer wherein the cable shield pressure ring is configured to apply an expansion force directed radially outward from a central axis of the annular ring wherein the expansion force directed radially outward acts on the flayed out cable shielding layer forcing the flayed out cable shielding layer into mating contact with the inside surface.

2. The cable gland assembly of claim 1 further comprising an annular weather gasket groove formed on the inside surface for engaging with the weather gasket at a desired longitudinal position within the hollow cavity and wherein the weather gasket groove is sized to compress the weather gasket against the cable sheath when the weather gasket is engaged with the annular weather gasket groove.

3. The cable gland assembly of claim 2 wherein the weather gasket has a circular cross-section, a gasket inside diameter and a gasket outside diameter and wherein the gasket inside diameter is less than or equal to an outside diameter of the cable sheath and wherein the gasket outside diameter is greater than or equal to an inside diameter of the annular weather gasket groove.

4. The cable gland assembly of claim 1 further comprising a an annular pressure ring groove formed on the inside surface for engaging with the cable shield pressure ring at a desired longitudinal position within the hollow cavity and wherein the annular pressure ring groove is sized to capture the flayed out cable shielding layer between an outside surface the cable shield pressure ring and an inside surface of the annular pressure ring groove.

5. The cable gland assembly of claim 4 wherein a diameter of the outside surface of the cable shield pressure ring is greater than or equal to an inside diameter of the annular pressure ring groove.

6. The cable gland assembly of claim 5 wherein the cable shield pressure ring comprises a non-electrically conductive O-ring formed with a circular cross sectional shape.

7. The cable gland assembly of claim 4 wherein the cable shield pressure ring comprises a compressible polymer material with modulus of elasticity ranging from 0.75 to 1.25 MPa.

8. The cable gland assembly of claim 1 wherein the first end of the annular wall is configured to mechanically interface with the housing aperture by threaded engagement and wherein the annular wall comprises aluminum.

9. The cable gland assembly of claim 8 further comprising an outer molding formed to fit over the outside surface between the housing aperture and the second end wherein the outer molding comprises one of a thermoplastic and a thermoset material.

10. The cable gland assembly of claim 1 further comprising a first environmental molding material disposed inside the hollow cavity to substantially fill annular space surrounding the cable sheath between the weather gasket and a trim line of the cable sheath wherein the first environmental molding material comprises a material that bonds to the cable sheath and bonds to the inside surface.

11. The cable gland assembly of claim 10 further comprising a second environmental molding material disposed inside the hollow cavity to substantially fill annular space extending from the trim line to the first aperture wherein the second environmental molding material comprises a material that bonds to the surfaces of the cable shield pressure ring, the cable shielding layer and bonds to the inside surface.

12. The cable gland assembly of claim 11 wherein the shielded cable further comprises an outer strength member comprising bundled fibers surrounding the at least one conductive strand wherein a length of the outer strength member is flayed radially outward inside the hollow cavity and wherein the second encapsulation layer is bonded to surfaces of the outer strength member.

13. The cable gland assembly of claim 12 wherein the shielded cable further comprises an inner strength member comprising bundled fibers disposed parallel to the at least one conductive strand and surrounded by the outer strength member wherein a length of the inner strength member is exposed inside the hollow cavity and wherein the second encapsulation layer is bonded to surfaces of the inner strength member.

14. The cable gland assembly of claim 13 wherein the cable shielding layer comprises a cylindrical tube of braided metal material.

15. The cable gland assembly of claim 13 wherein the cable shielding layer further comprises a cylindrical tube of metal foil surrounding the braided metal material.

16. The cable gland assembly of claim 13 wherein the shield cable includes a second terminal disposed outside the cable gland housing terminated by an external electrical connector.

17. The cable gland of claim 1 wherein the at least one conductive strand comprises a plurality of conductive strands each having an insulating layer surrounding a conductive strand wherein the plurality of conductive strands includes at least one power channel and at least one communication channel.

18. A cable gland assembly for attaching a shielded cable to an enclosure housing wherein the shielded cable comprises a plurality of conductive strands each surrounded by an electrically insulating layer, an inner strength member comprising bundled fibers disposed parallel to the plurality of conductive stands, wherein the plurality of conductive strands and the inner strength member is surrounded by an outer strength member comprising bundled fibers wherein the plurality of conductive strands, inner strength member and the outer strength member is surrounded by a cable shielding layer comprising a cylindrical tube of braided metal material wherein the cable shielding layer is surrounded by an electrically insulating cable sheath comprising:

a cable gland housing formed by an annular wall surrounding a hollow cavity wherein the annular wall includes an inside surface facing the hollow cavity and an outside surface radially opposed to the inside surface, wherein a first end of the annular wall is configured to mechanically interface with the enclosure housing through a housing aperture and wherein a second end of the annular wall is configured to mechanically interface with a first terminal end of the shielded cable, wherein a first aperture defined by the inside surface at the first end provides access from the hollow cavity into the enclosure housing through the housing aperture and a second aperture defined by the inside surface at the second end provides access for receiving a first terminal end of the shielded cable into the hollow cavity;

wherein a portion of the cable sheath is stripped from the first terminal end to expose the cable shielding layer inside the hollow cavity and wherein a portion of the cable shielding layer is stripped from the first terminal end to leave a length of the cable shielding layer exposed and flayed radially outward inside the hollow cavity and to leave a length of the outer strength member and a length of the inner strength member flayed radially outward inside the hollow cavity;

a weather gasket comprising an annular ring disposed inside the hollow cavity between the cable sheath and the inside surface proximate to the second aperture, wherein the weather gasket is configured to apply a radially inwardly directed compression force against the cable sheath when the weather gasket is compressed between the inside surface and the cable sheath;

a cable shield pressure ring comprising an annular ring installed inside the hollow cavity between the at least one conductive strand and the flayed out cable shielding layer wherein the cable shield pressure ring is configured to apply an expansion force directed radially outward from a central axis of the annular ring wherein the expansion force directed radially outward acts on the flayed out cable shielding layer forcing the flayed out cable shielding layer into mating contact with the inside surface;

a first environmental molding material disposed inside the hollow cavity to substantially fill annular space surrounding the cable sheath between the weather gasket and a trim line of the cable sheath wherein the first environmental molding material comprises a material that bonds to the cable sheath and bonds to the inside surface;

a second environmental molding material disposed inside the hollow cavity to substantially fill annular space extending from the trim line to the first aperture wherein the second environmental molding material comprises a material that bonds to the surfaces of the cable shield pressure ring, bonds to the cable shielding layer, bonds to fibers of the inner strength member and to the fibers of the outer strength member and bonds to the inside surface;

an outer molding formed to fit over the outside surface between the housing aperture and the second end wherein the outer molding comprises one of a thermoplastic and a thermoset material;

wherein the first end of the annular wall is configured to mechanically interface with the housing aperture by threaded engagement and wherein the annular wall comprises aluminum.

\* \* \* \* \*

UNITED STATES PATENT AND TRADEMARK OFFICE
CERTIFICATE OF CORRECTION

PATENT NO. : 9,640,965 B1
APPLICATION NO. : 15/081461
DATED : May 2, 2017
INVENTOR(S) : David N. Long et al.

It is certified that error appears in the above-identified patent and that said Letters Patent is hereby corrected as shown below:

In the Claims

Column 11, Line 17 Claim 1, "first terminal" should read -- first terminal end --

Column 11, Line 54 Claim 4, "a" should be deleted

Column 11, Line 59 Claim 4, "surface the cable" should read -- surface of the cable --

Column 12, Line 34 Claim 12, "second encapsulation layer" should read -- second environmental molding material --

Column 12, Lines 41-42 Claim 13, "second encapsulation layer" should read -- second environmental molding material --

Column 12, Line 51 Claim 16, "second terminal" should read -- second terminal end --

Column 12, Line 66 Claim 18, "is" should read -- are --

Column 13, Line 2 Claim 18, "is" should read -- are --

Signed and Sealed this
Twenty-ninth Day of May, 2018

Andrei Iancu
*Director of the United States Patent and Trademark Office*